United States Patent [19]

Vanderjagt

[11] Patent Number: 4,557,669
[45] Date of Patent: Dec. 10, 1985

[54] PUMPING APPARATUS

[76] Inventor: John A. Vanderjagt, 1395 Glen Oaks, Memphis, Tenn. 38117

[21] Appl. No.: 646,916

[22] Filed: Sep. 4, 1984

[51] Int. Cl.⁴ .......................... F04B 1/12; F04B 27/03
[52] U.S. Cl. ...................................... 417/271; 417/566; 137/852; 137/854; 222/383
[58] Field of Search ........................ 417/269, 271, 556; 137/852, 854; 222/383

[56] References Cited

U.S. PATENT DOCUMENTS

| | | | |
|---|---|---|---|
| 2,159,289 | 5/1939 | Nickelsen | 137/854 |
| 2,214,364 | 9/1940 | Edwards | 137/854 |
| 2,277,333 | 3/1942 | Leopold | 415/293 |
| 2,797,647 | 7/1957 | Floraday | 417/566 |
| 2,850,981 | 9/1958 | Arp | 417/566 |
| 2,955,475 | 10/1960 | Zubaty | 417/269 |
| 2,991,723 | 7/1961 | Zubaty | 417/269 |
| 3,010,403 | 11/1961 | Zubaty | 417/266 |
| 3,199,531 | 8/1965 | Cornelius et al. | 417/271 |
| 3,754,842 | 8/1973 | Schlawzky | 417/269 |
| 3,954,474 | 3/1976 | Palmer | 137/854 |
| 4,105,369 | 8/1978 | McClockin | 417/269 |
| 4,153,391 | 5/1979 | Hartley | 417/269 |
| 4,195,970 | 4/1980 | Zalis | 417/269 |
| 4,226,572 | 10/1980 | Nakayama | 417/269 |
| 4,283,166 | 8/1981 | Hiraga | 417/269 |
| 4,396,357 | 8/1983 | Hartley | 417/269 |
| 4,486,151 | 12/1984 | Wesala | 417/566 |

FOREIGN PATENT DOCUMENTS

| | | | |
|---|---|---|---|
| 3233987 | 3/1984 | Fed. Rep. of Germany | 417/269 |
| 1157249 | 5/1958 | France | 417/269 |

Primary Examiner—William L. Freeh
Attorney, Agent, or Firm—Walker & McKenzie

[57] ABSTRACT

A pumping apparatus for pumping heavy viscous chemicals and the like. The apparatus has a pump means having means for attachment to a container of the viscous chemicals and the like, and has driving means including a motor and means for detachably connecting the driving means to the pump means so that the pump means and driving means are separable, and the driving means may be used with other pump means.

11 Claims, 30 Drawing Figures

PUMPING APPARATUS

BACKGROUND OF THE INVENTION

1. Field of the Invention

The present invention relates to a pumping apparatus for pumping heavy viscous chemicals and the like.

2. Description of the Prior Art

Heretofore, the usual type of separate pumping apparatus which was adapted to be used with containers (drums, barrels, and the like) of liquid chemicals and the like for pumping of the liquid was an integral 12 volt motor driven pump having a suction pipe attached thereto. The suction pipe was inserted into an opening in the container and after the pumping was completed, the apparatus was lifted from the container and placed into the next container, which may or may not have been the same type of chemical. Thus, in the lifting of the suction pipe from one container to the next, there was a problem of dripping of the liquid therefrom, resulting in health or other hazards, particularly with poisonous or hazardous chemicals. Also, in moving from a container of one type of chemical to another, there was the problem of contamination and mixing thereof of one with another caused by the residual chemicals left in the pump and suction pipe from the pumping of the previous chemicals and the like. Also, many times the user of the pump would not clean the pump and certain chemicals caused clogging or rusting thereof, necessitating the replacement with new parts or a new pump. Further, there had been no completely satisfactory 12 volt pumping apparatus for pumping heavy viscous chemicals.

SUMMARY OF THE INVENTION

The present invention is directed towards providing an improved pumping apparatus for pumping heavy viscous chemicals and the like, which apparatus overcomes the above-mentioned and other problems encountered in pumping heavy viscous chemicals and the like.

The apparatus of the present invention comprises, in general, pump means including diaphragm means, means establishing a plurality of pump chambers, and a plurality of piston means attached to said diaphragm; motor means including a rotatable shaft; non-rotatable swash plate means attached to said shaft; and means for detachably coupling said motor means to said pump means with the upper distal ends of the piston means engaging the swash plate and with the swash plate being at an angle for successively moving the piston means into lowered positions and for subsequently allowing the piston means to successively move to raised positions.

One of the objects of the present invention is to provide a pumping apparatus for heavy viscous chemicals which includes unique means for detachably joining a motor means and a pump means together so that the user can quickly and easily detach the motor means from one pump means and reattach it to another. Thus, the user may buy just one motor means to be used with a number of other less expensive pump means, whereby the user can keep the pump means segregated to be used with particular chemicals without interchanging same.

A further object is to provide such an apparatus having improved valve means comprising pairs of adjacent resilient leaf springs disposed in flat face to face engagement which are effective and durable.

A further object is to provide means for preventing clogging or build-up of material in the valve means.

A further object is to provide means in such a system to decrease the drip of the pumped material when moving the apparatus from one container to another.

DESCRIPTION OF THE PREFERRED EMBODIMENT

Figure 1:
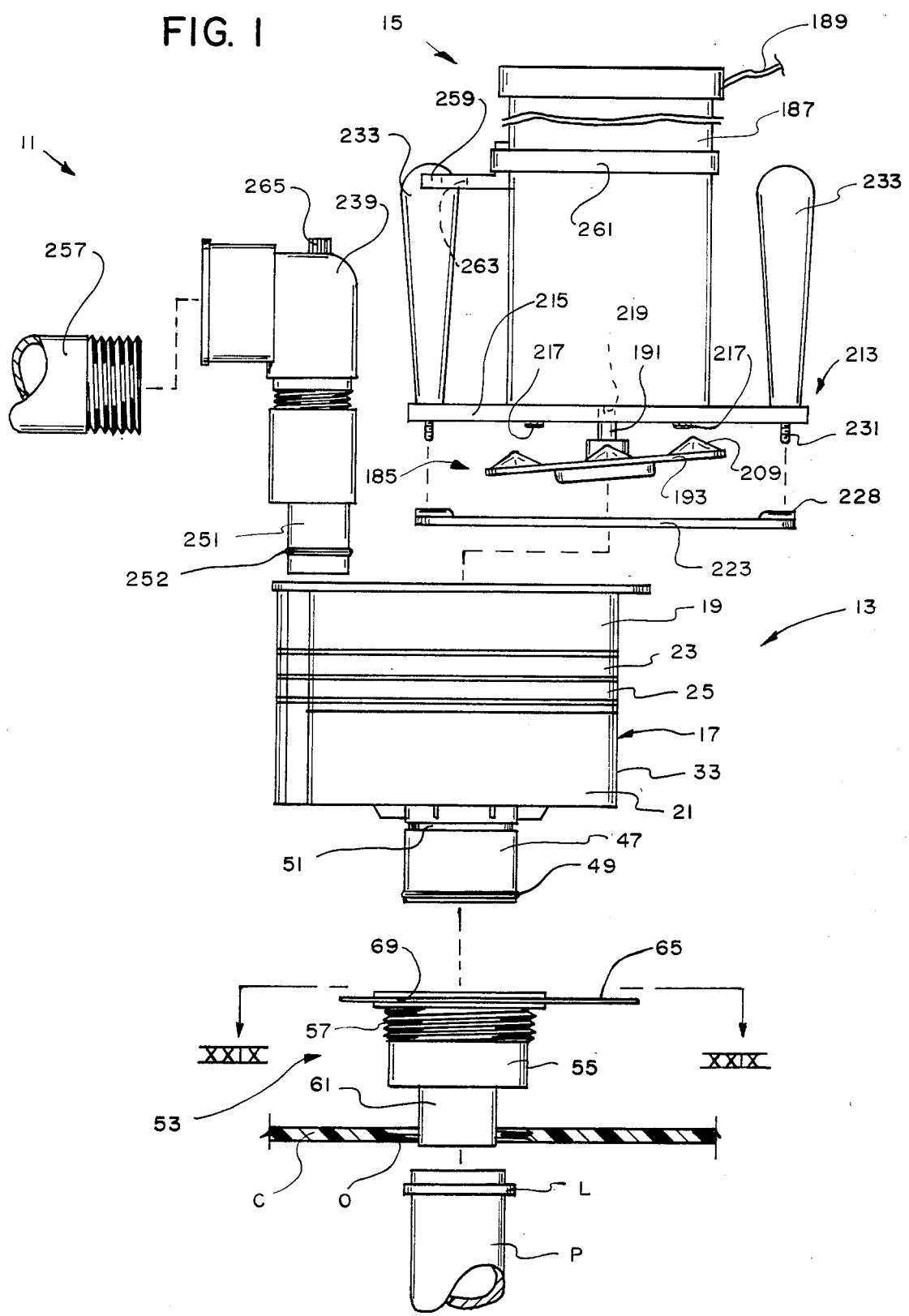
FIG. 1 is an exploded view of the pumping apparatus of the present invention showing means for the connection thereof to a container and to a discharge hose.
Figure 2:
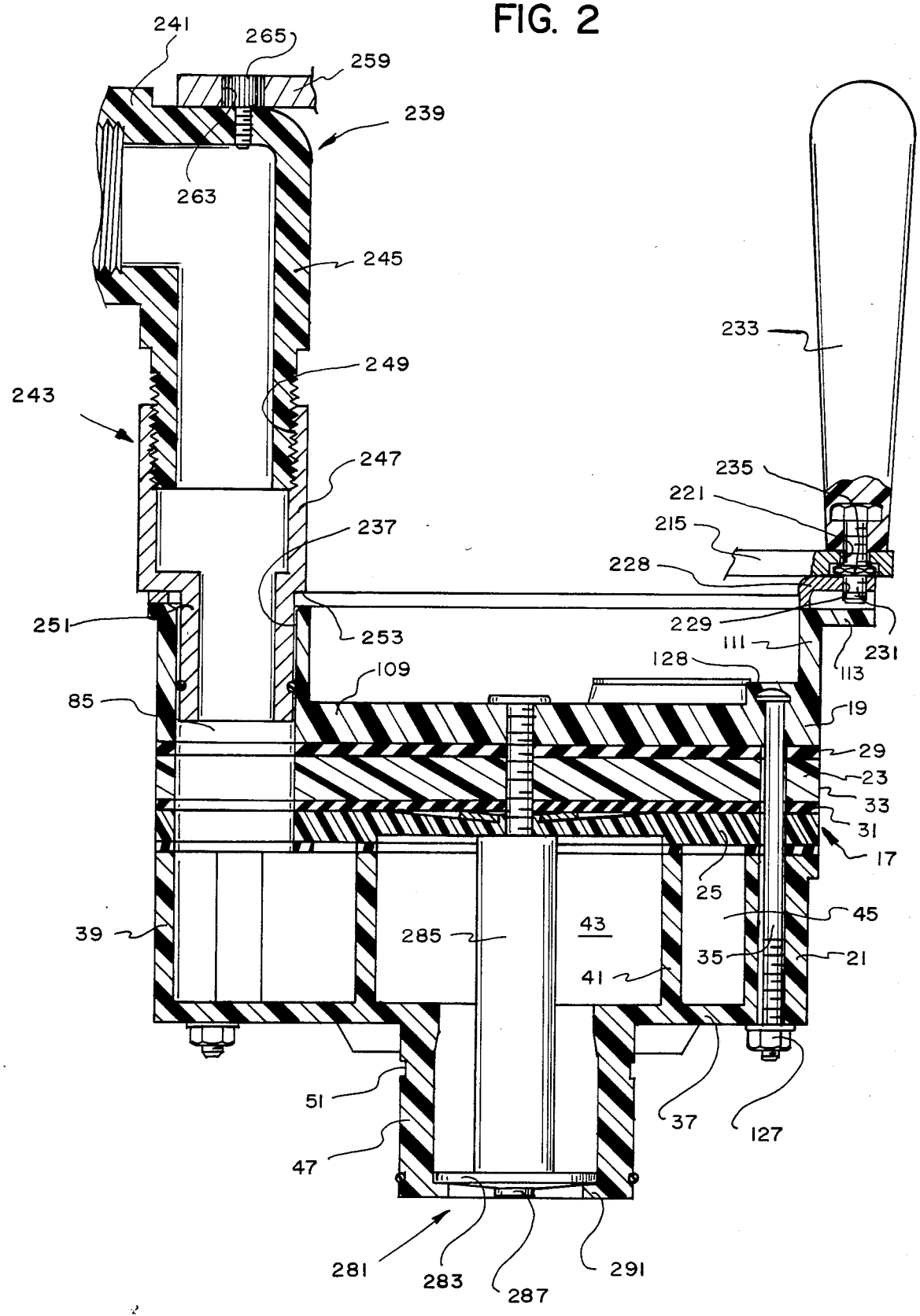
FIG. 2 is an enlarged sectional view taken as on the line II—II of FIG. 4 and with a partial showing of the means for detachably coupling the motor means to the pump means.

The pumping apparatus 11 of the present invention includes, in general, a pump means 13 and a detachable driving means 15.

Pump means 13 includes a pump body 17 preferably formed from a plastic that can be disposed of. Pump body 17 is generally cylindrical and includes an upper section 19 and a lower section 21. An upper plate 23 and a valve plate 25 are sandwiched between upper section 19 and lower section 21. A flexible diaphragm means 27 is sandwiched between upper section 19 and upper plate 23. A first gasket 29 is sandwiched between plate 23 and valve plate 25, and a second gasket 31 is sandwiched between valve plate 25 and lower section 21. The outer peripheral portion of upper section 29, lower section 21, upper plate 23, valve plate 25, diaphragm means 27, first gasket 29 and second gasket 31 form a substantially cylindrical side wall 33 of pump body 17. The parts of side wall 33 are held together by suitable means as bolts 35.

Lower section 21 includes an annular bottom 37, an annular side wall 39 integrally formed at the outer edges of bottom 37 and upstanding therefrom, an annular inner wall 41 integrally formed with bottom 37 and upstanding therefrom at a place spaced inwardly from side wall 39 to establish with valve plate 25 an inlet chamber 43 inwardly of inner wall 41 and to establish a concentric outlet chamber 45 outwardly of inner wall 41. Lower section 21 additionally includes inlet pipe means 47 integrally formed with bottom 37, depending centrally therefrom and which is communicated with inlet chamber 43 at the upper end thereof. An O-ring 49 is provided in a groove 50 adjacent the lower end of inlet pipe means 47, and a groove 52 is provided around the outside of inlet pipe means 47 adjacent the upper end thereof for purposes hereinafter to be described.

A bung adapter or connecting means 53 is provided for connecting pump means 13 to a container C such as a drum or barrel or the like containing the heavy viscous chemicals and the like therein, and to connect pump means 13 to an intake pipe P in container C.

Figure 29:
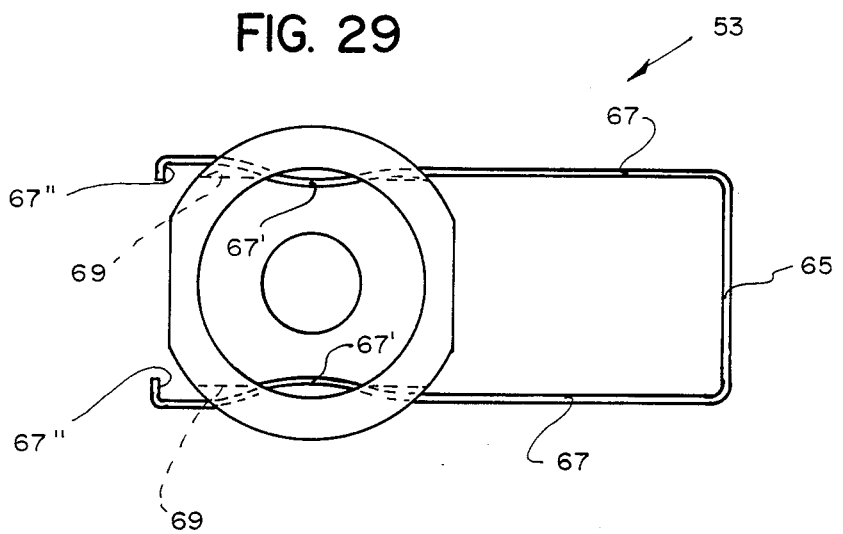
FIG. 29 is an enlarged plan view of the connecting means taken as on line XXIX—XXIX of FIG. 1.

Connecting means 53 comprises an upper pipe-like portion 55 provided with external screw threads 57 adapted to be threaded into the internally threaded bunghole or opening O provided in the upper wall of container C. Connecting means 53 additionally includes an upwardly opening socket 59 in upper portion 55 adapted to receive inlet pipe means 47 with O-ring 49 providing a fluid tight seal therebetweeen. Also, connecting means 53 includes a lowr pipe-like portion 61 integrally attached centrally of upper pipe-like portion 55 and depending therefrom and with the interior of lower pipe-like portion 61 communicating with socket 59. Lower pipe like portion 61 is reduced in diameter as compared with upper pipe like portion 55, and there is a shoulder 63 established at the bottom of socket 59 at the juncture with the lower pipe like portion 61. It will be understood that the shoulder 63 will act as a stop for the lower end of inlet pipe means 47. In addition connection means 53 includes a catch means 65, which is preferably in the form of an elongated resilient piece of wire bent into a horseshoe shape, as best seen in FIG. 29 with opposite portions 67' of the legs 67 of catch means 65 extending through horizontal slots 69 in the opposite sides of upper pipe like portion 55 and extending into groove 51 to retain the connection means 53 on inlet pipe means 47. It will be understood that the legs 67 are biased inwardly towards one another into slots 69 and groove 51, and in order to release connecting means 53 it is only necessary to spread the portion 67' apart as by moving the leg 67 apart, which can be done by pushing outwardly on end portions 67" of legs 67 or pulling outwardly on the main portion of legs 67.

The upper end of intake pipe P is fitted over lower pipe like portion 61 and held thereon by suitable means as the clamp L well known to those skilled in the art. It will be understood that the lower end of pipe P extends donwardly into container C adjacent the lower portion thereof so that the open end of pipe P will be disposed in the heavy viscous chemicals or the like to be pumped from the container C.

Figure 9:
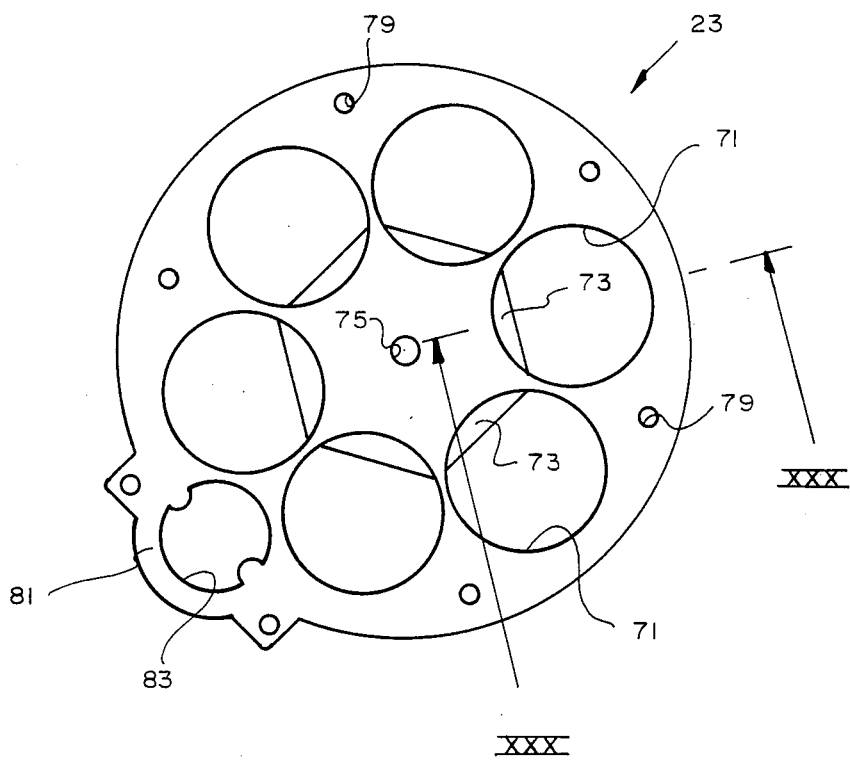
FIG. 9 is a plan view of the upper plate of the pump means of the present invention.
Figure 10:
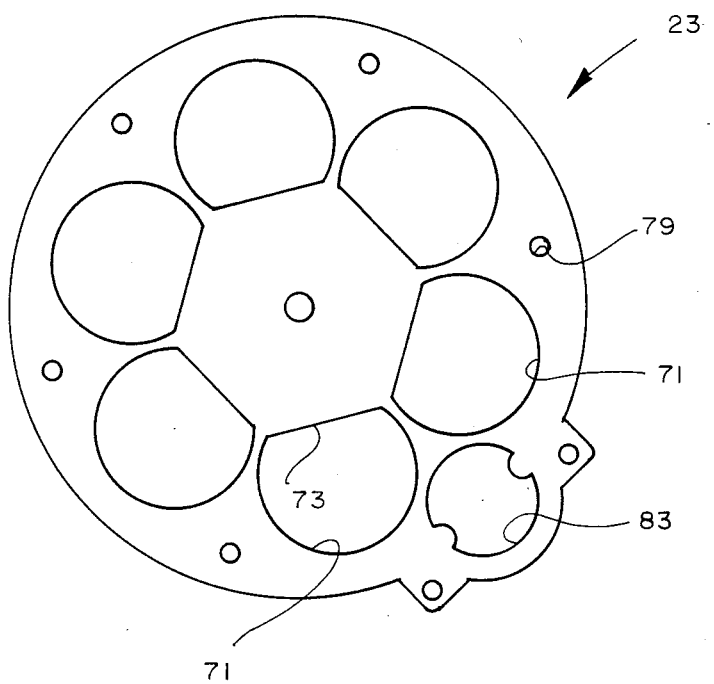
FIG. 10 is a bottom view of that shown in FIG. 9.
Figure 11:
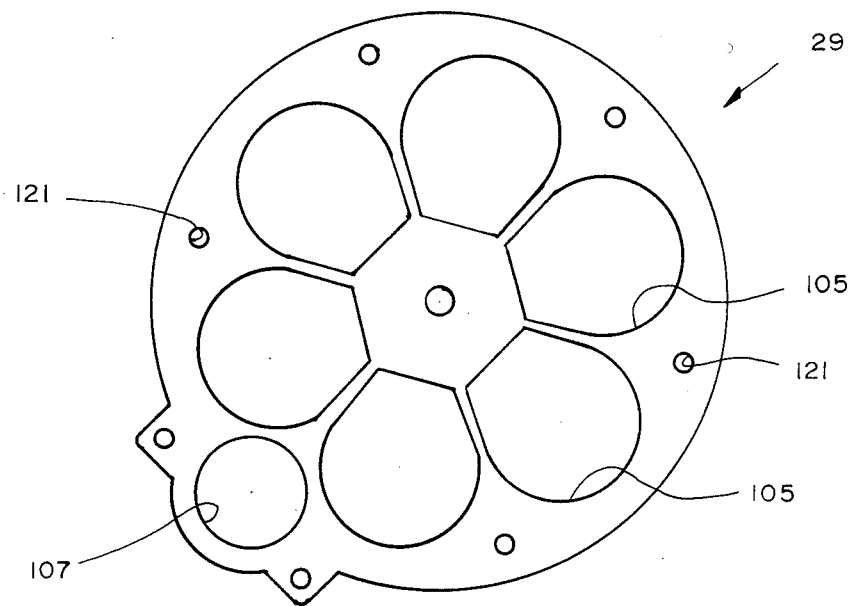
FIG. 11 is a plan view of one of the gaskets of the pump means.
Figure 12:
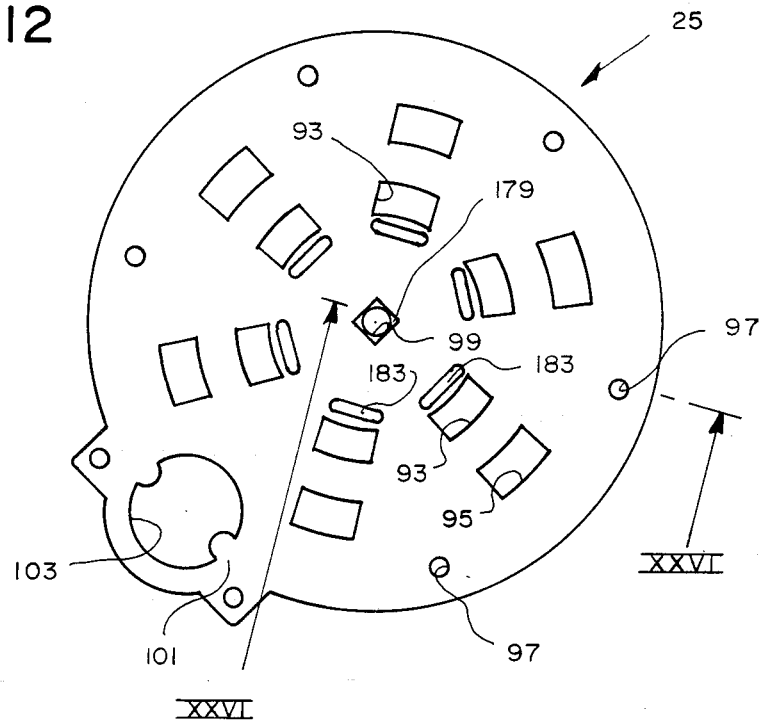
FIG. 12 is a plan view of the valve plate of the pump means.
Figure 13:
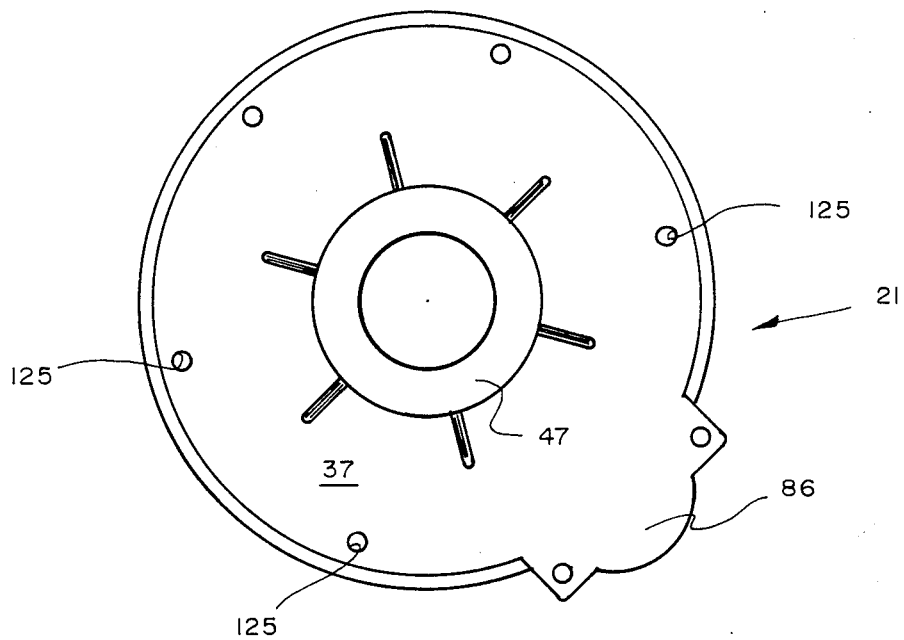
FIG. 13 is a bottom view of the lower section of the pump means.
Figure 14:
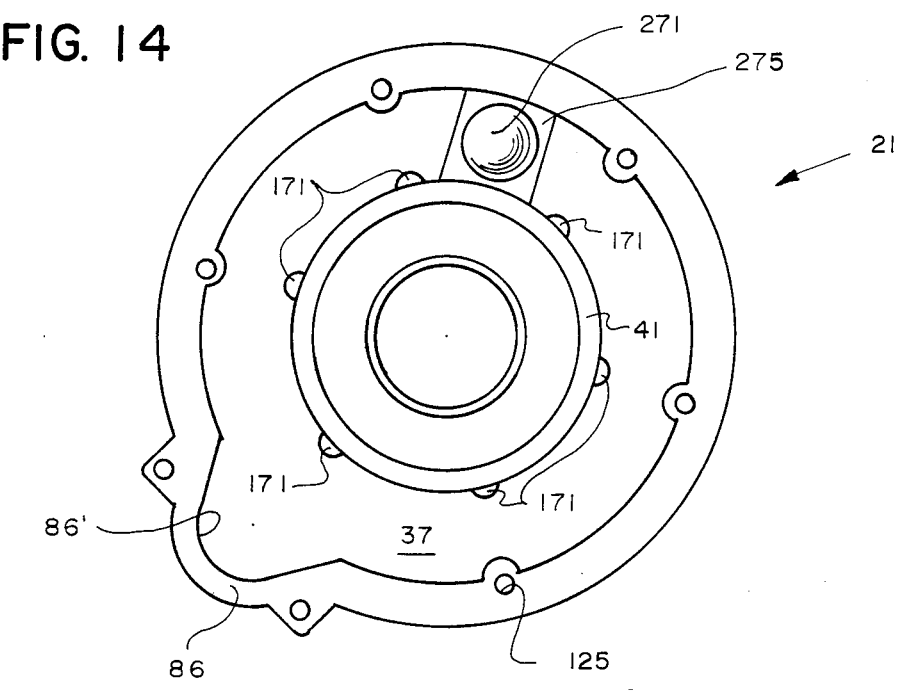
FIG. 14 is a plan view of that shown in FIG. 13.
Figure 15:
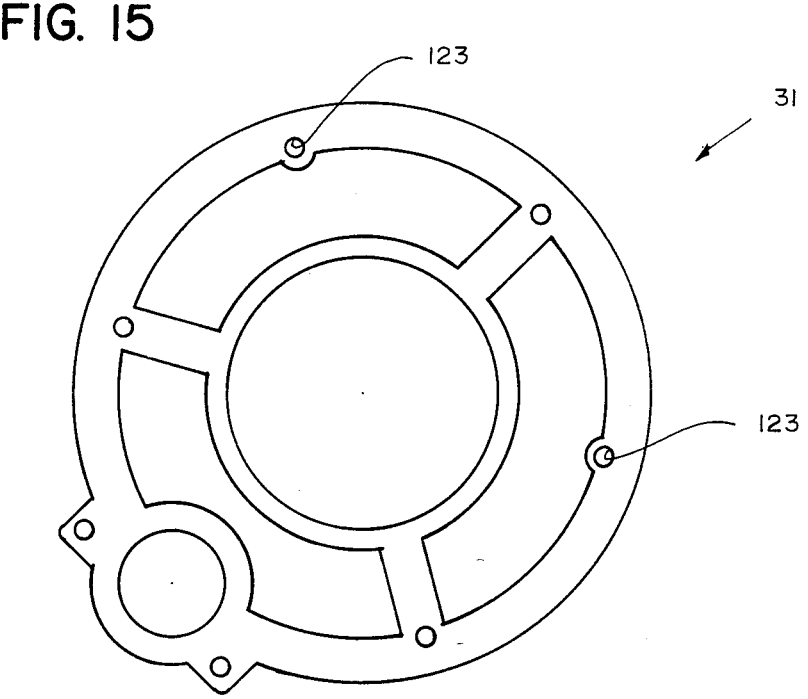
FIG. 15 is a plan view of another of the gaskets of the pump means.
Figure 16:
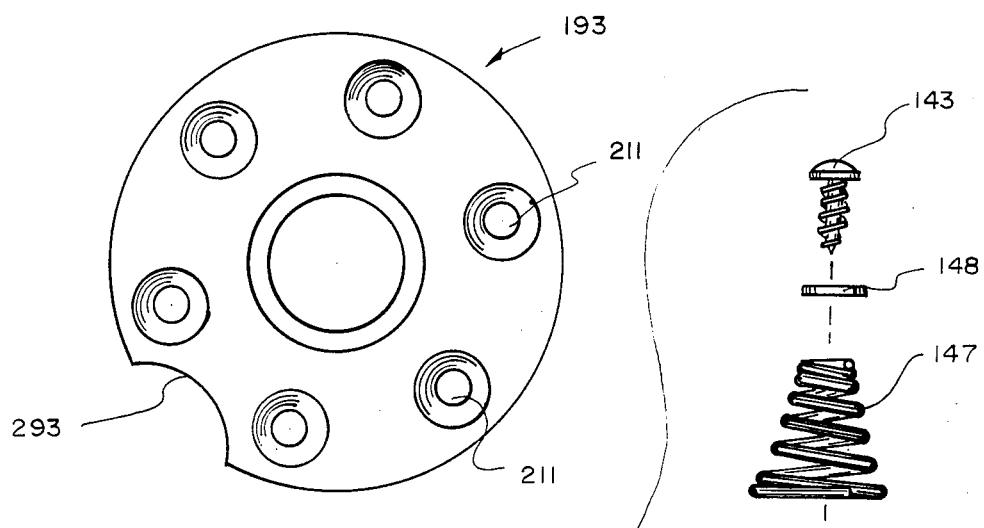
FIG. 16 is a bottom view of the swash plate of the driving means.
Figure 17:
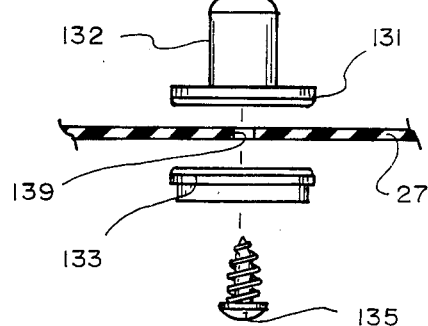
FIG. 17 is an exploded view of one of the piston means of the pump means.
Figure 18:
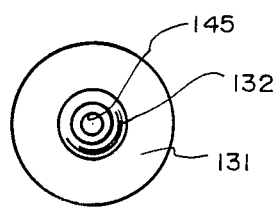
FIG. 18 is a plan view of the upper part of one of the pistons.
Figure 20:
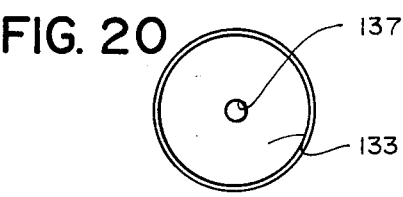
FIG. 20 is a plan view of the lower part of one of the pistons.
Figure 19:
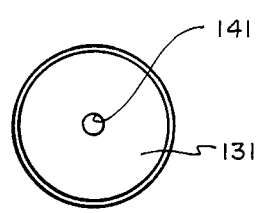
FIG. 19 is a bottom view of that shown in FIG. 18.
Figure 21:
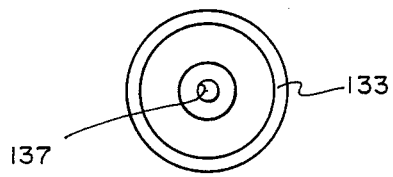
FIG. 21 is a bottom view of that shown in FIG. 20.
Figure 30:
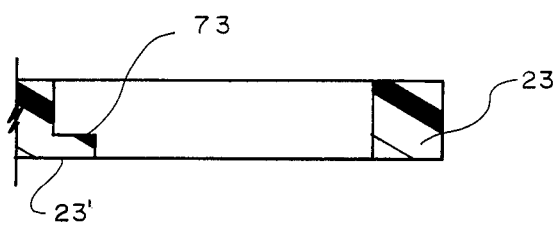
FIG. 30 is an enlarged sectional view taken as on the line XXX—XXX of FIG. 9.

Upper plate 23 (see FIGS. 9, 10 and 30) includes a plurality of circular openings 71 therethrough, which preferably are spaced evenly around the plate and are preferably, though not necessarily six in number, with the number depending upon the volume desired for the pump means 13. Each of the openings 71 are provided with a stop 73 in the form of a step like portion extending across a portion of the opening adjacent the lower surface 23' of upper plate 23 for a purpose later to be described. Centrally of plate 23 is an opening 75 through which extends bolt means 77 for clampingly holding together central portions of certain parts of pump means 13. A plurality of holes 79 are disposed around plate 23 to receive bolts 35. A portion of upper plate 23 extends outwardly adjacent the periphery thereof as at 81 and which has an opening 82 therethrough that establishes a portion of outlet passage 85 in pump body 17 as will be better understood in the description to follow. Also, a portion of lower section 21 extends outwardly as at 86 to establish the entrance 86' where outlet chamber 45 and outlet passage 85 join.

Valve plate 25 (see FIGS. 12 and 22–25) includes in the lower surface thereof an outer annular recess 87 and a central recess 89 separated by an annular wall portion 91. A plurality of inlet apertures 93 are provided vertically through valve plate 25 into central recess 89. Inlet apertures 93 are of a like number as openings 71 and are disposed in substantial alignment therewith. Similarly, valve plate 25 has a plurality of outlet apertures 95 extending vertically therethrough into annular recess 87 and which also are disposed in substantial alignment with openings 71 and are of a like number as openings 71. Also, valve plate 25 is provided with a plurality of holes 97 around the periphery thereof through which bolts 35 pass. In addition valve plate 25 has a central hole 99 through which bolt means 77 passes. Additionally, a portion of valve plate 25 extends outwardly as at 101 with an opening 103 therethrough in a similar manner to portion 81 and opening 83 in upper plate 23 with the openings 83 and 103 being in alignment to establish part of the outlet passage 85. Also, diaphragm means 27 extends outwardly as at 27' through which an opening 104 is provided to align with openings 83 and 103.

The gasket 29 that fits between plates 23 and 25 is provided with a plurality of cut out portions 105 which correspond and are substantially in alignment with the respective openings 71. In addition, there is an opening 107 through gasket 29 to correspond to openings 82 and 103.

Upper section 19 includes a circular bottom portion 109, an annular side wall 111 integrally formed at the outer edges of bottom portion 109 and upstanding therefrom, and a flange 113 integrally formed with the upper edge of side wall 111 and extending outwardly therefrom. A plurality of circular openings 115 are provided through bottom portion 109 substantially in alignment with openings 71, that is, the openings 115, 71 are disposed along the same vertical axis but openings 115 are smaller in diameter than openings 71. Also, it will be understood that there are the same number of openings 115 as openings 71. In addition, there are a plurality of holes 117 disposed in bottom portion 109 adjacent the periphery thereof through which extends bolts 35, with the head of the bolts being disposed above the upper surface of bottom portion 109 and with the bolts extending downwardly through holes 117, holes 119 in diaphragm means 27, holes 79, holes 121 in gasket 29, holes 97, holes 123 in second gasket 31 and elongated holes 125 in lower section 21, and thence below the lower surface of annular bottom 37 where the ends of bolts 35 are secured by nuts 127 to hold pump body 17 together. The heads of bolts 35 are preferably embedded in the plastic of upper section 19 as at raised portions 128 to fixedly secure bolts 35.

There are a plurality of piston means 129 respectively provided to operate through the circular openings 71. Thus, there are preferably six piston means 129 and the following description of one will suffice for all as they are substantially identical.

Figure 5:
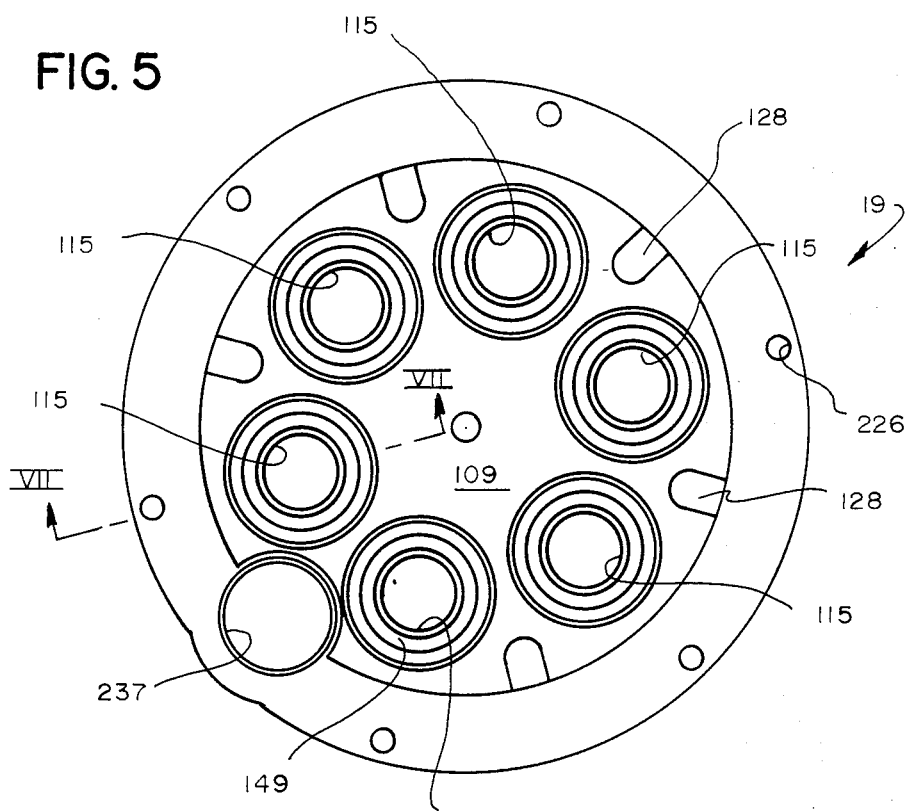
FIG. 5 is a plan view of the upper section of the pump means.
Figure 6:
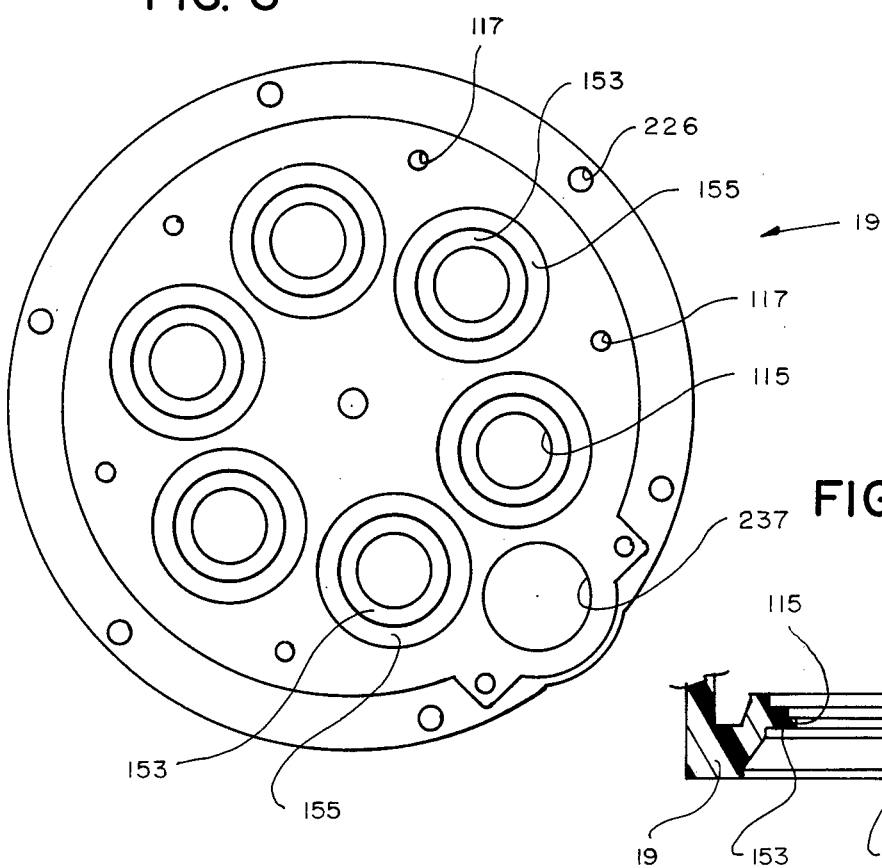
FIG. 6 is a bottom view of that shown in FIG. 5.
Figure 7:
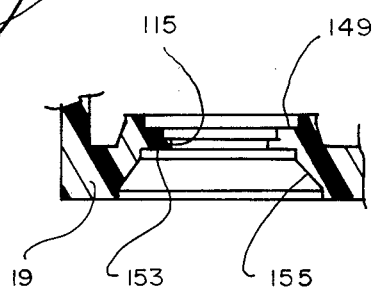
FIG. 7 is an enlarged sectional view taken as on the line VII—VII of FIG. 5.
Figure 8:
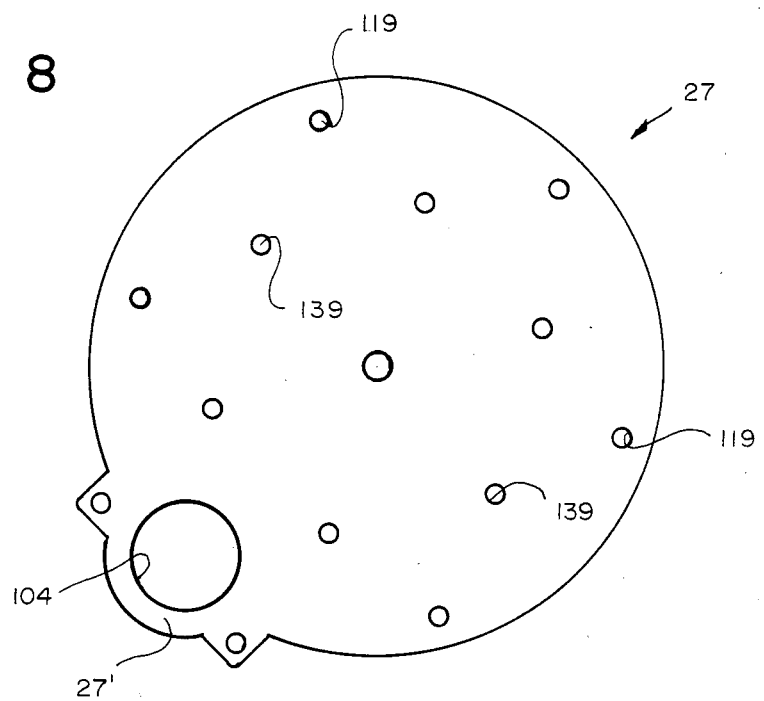
FIG. 8 is a plan view of the pump diaphragm means.

Piston means 129 (see FIGS. 17–21) includes a circular upper head means 131 disposed above diaphragm means 27, a centrally disposed rod means 132 integrally formed with upper head means 131 and upstanding therefrom and a circular lower head means 133 disposed below diaphragm means 27 in alignment with upper head means 131. Means is provided for urging upper and lower head means 131, 133 together to clamp a portion of diaphragm means 27 therebetween, which means preferably comprises a screw 135, that extends upwardly through a central aperture 137 in lower head means 133, an aperture 139 in diaphragm means 27, and is threadedly received in aperture 142 in upper head means 131 and rod means 132. The upper distal end of rod means 132 is preferably rounded as by providing a screw 143 threaded into an aperture 145 provided in rod means 132. A conically shaped compression spring means 147 is attached around rod means 132. Spring means 147 is attached adjacent the upper end thereof to the upper distal end of rod means 132 by screw 143, and a washer 148 is provided around screw 143 between the head thereof and the upper end of spring means 147. It will be understood that the distal upper end of rod means 132 is reduced in diameter as at 132′ extends up through the narrower upper portion of spring means 147. The lower larger end of spring means 147 rests against a seat 149 provided in upper section 19 around opening 115 (see FIGS. 5 and 7). Additional seats 153 are provided in upper section 19 respectively around openings 115 but are disposed below seats 149 and towards the lower side of upper section 19 (see FIGS. 6 and 7). Each seat 153 is provided for the seating of upper head means 131 when the particular piston means 129 is in an upper position as shown by the piston means 129 to the right in FIG. 3, as will be better understood in the description to follow. Also, upper section 19 is flared outwardly and donwwardly from seat 153 as at 155 to accommodate portions of the diaphragm means 27 when the piston means 129 is in said upper position.

A pump chamber 157 is provided beneath each of the piston means 129 and extends downwardly to valve plate 25. The chamber 157 is variable in size depending upon the position of the piston means 129. Thus, when a piston means 129 is in said upper position as shown by the one to the right in FIG. 3, the size or volume is at a maximum and when it is in a lowered position, it is at a minimum. Each of the chambers 157 is thus defined by portions of diaphragm means 27, lower head means 133, portions of upper plate 23 which define circular openings 71, and portions of valve plate 25.

Figure 3:
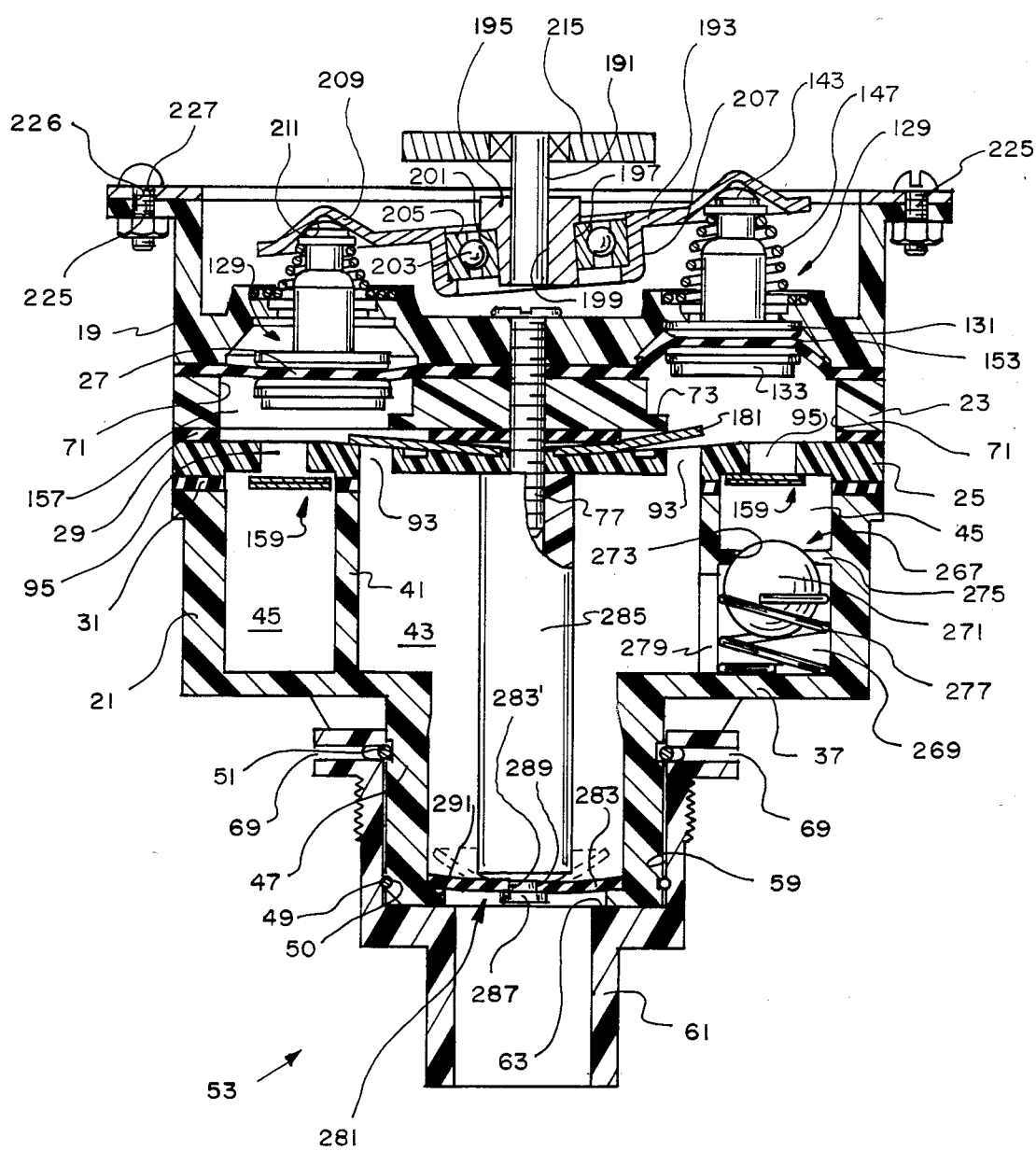
FIG. 3 is an enlarged sectional view taken as on the line III—III of FIG. 4 and with a partial showing of the driving means assembled therewith.
Figure 4:
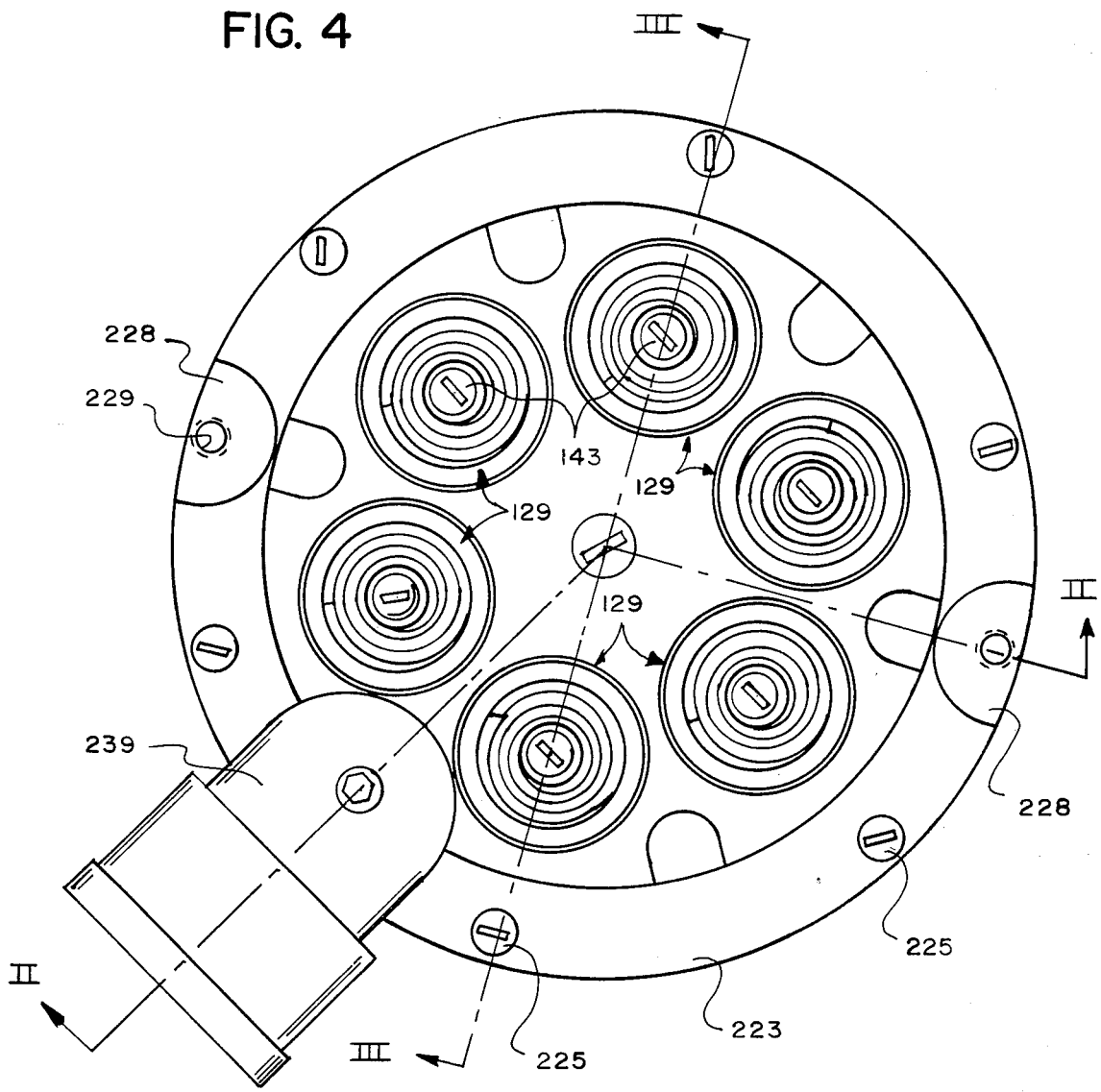
FIG. 4 is plan view of the pump means of the present invention.
Figure 22:
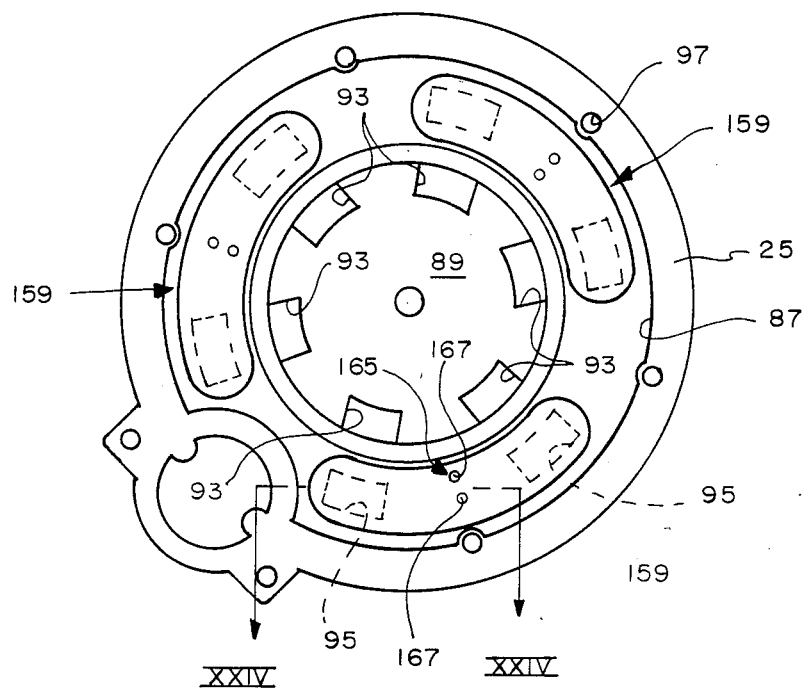
FIG. 22 is a bottom view of the valve plate with the valves shown in place and showing the outlet valve apertures in broken lines.
Figure 23:
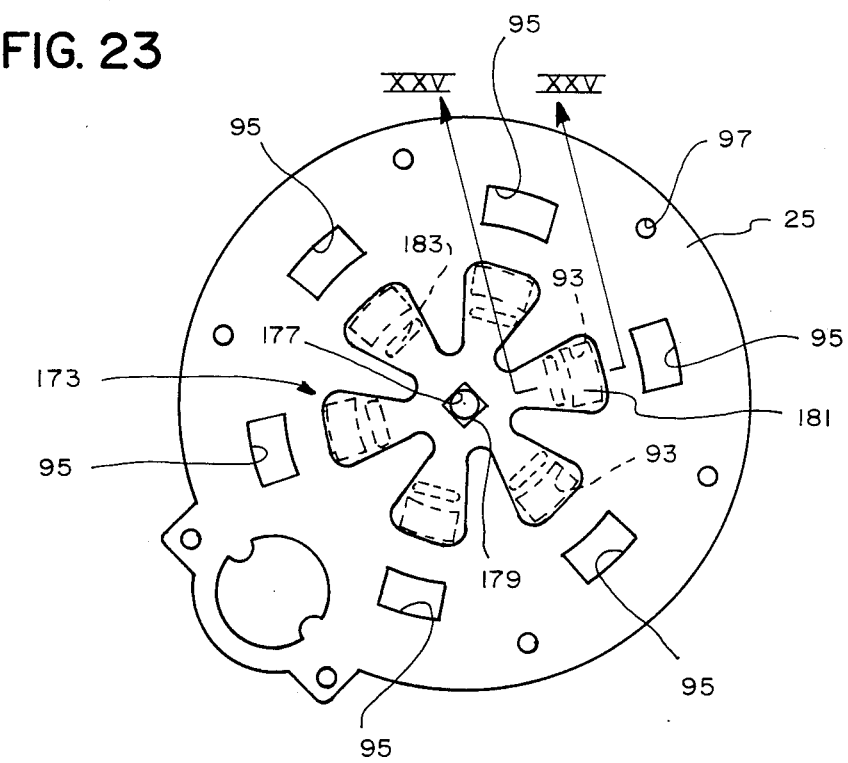
FIG. 23 is a plan view of that shown in FIG. 22 with the recesses and inlet apertures being shown in broken lines.
Figure 24:
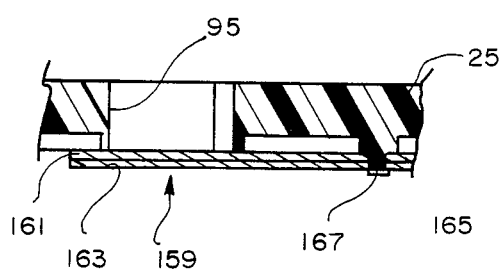
FIG. 24 is an enlarged fragmentary sectional view taken as on the line XXIV—XXIV of FIG. 22.
Figure 25:
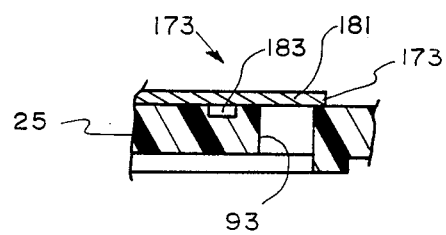
FIG. 25 is an enlarged fragmentary sectional view taken as on the line XXV—XXV of FIG. 23.
Figure 26:
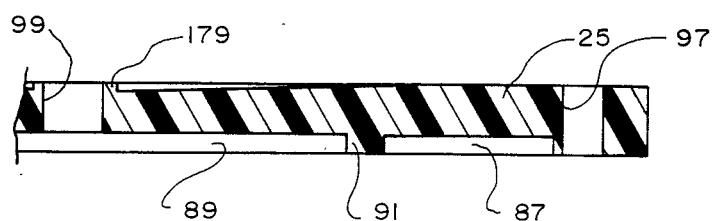
FIG. 26 is an enlarged fragmentary view taken as on the line XXVI—XXVI of FIG. 12.
Figure 27:
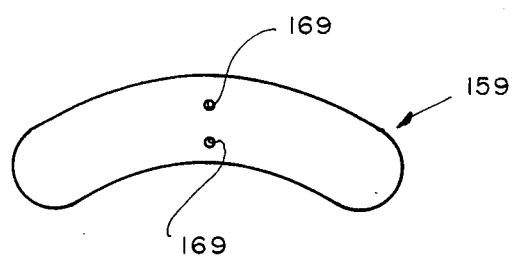
FIG. 27 is a plan view of the outlet valve means.

A plurality of spring actuated outlet valve means 159 operate respectively with outlet apertures 95 for the opening and closing thereof to govern flow from pump chamber 157 to outlet chamber 45. The outlet valve means 159 to the left in FIG. 3 is shown in an open position and the one to the right is shown in a closed position. Outlet valve means 159 are preferably arranged in pairs with each of the pairs including an arcuate flat and resilient upper leaf spring 161 and an arcuate flat and resilient lower leaf spring 163 which is preferably of the same size and shape as upper leaf spring 161 and is disposed in flat face to face engagement therewith (see, in general, FIGS. 24 and 27). Upper leaf spring 161 is of a lesser thickness than lower leaf spring 163. A preferable thickness for leaf spring 161 is five thousandths of an inch and the preferable thickness of leaf springs 163 is ten thousandths of an inch, and both are preferably formed of resilient spring steel. It has been found that with the use of a thin leaf spring as leaf spring 161 above the thicker leaf spring 163 that the resulting spring actuated valve means 159 is durable and much more so than a single leaf spring. Attaching means 165 is provided for attaching leaf springs 161, 163 to valve plate 25. Attaching means 165 preferably includes pin means 167 extending through hole means 169 provided intermediate the ends of leaf springs 161, 163. There are preferably a pair of each pin means 167 and hole means 169 as the attaching means 165 for each pair of leaf springs 161, 163. Pin means 167 is preferably formed integrally at the upper end thereof with valve plate 25 and the body of pin means 167 is preferably cylindrical with the distal end being rounded. The above described attaching means 165 provides a very quick and simple means of assembly for the valve means 159. It will be understood that portions 171 which project outwardly from wall 41 engage outlet valve means 159 to retain the leaf springs 161, 163 on the pin means 167. Leaf springs 161, 163 are positioned directly in line one above the other with the leaf springs adjacent the opposite ends thereof remote from attaching means 165 underlying respectively a pair of outlet apertures 95, as best seen in FIGS. 22 and 24. Thus, the distal ends of the upper and lower leaf spring 161, 163 normally close the outlet apertures 95 to prevent the flow upwardly through the apertures from outlet chamber 45 but permit flow downwardly through the apertures into outlet chamber 45. It will be understood that the inherent resiliency of the steel leaf springs will return the leaf springs to a closed position relative to the outlet apertures 95 when there is no flow passing therethrough. Thus, it will be understood that the outlet valve means 159 is biased towards a closed position.

Figure 28:
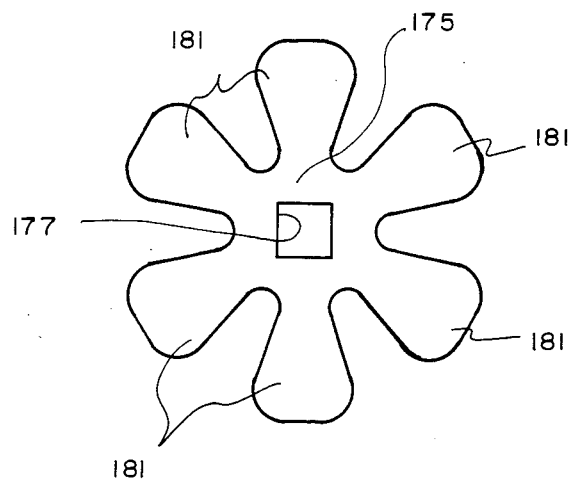
FIG. 28 is a plan view of the inlet valve means.

A plurality of spring actuated inlet valve means 173 operate respectively in conjunction with inlet apertures 93 for the opening and closing thereof to govern flow from inlet chamber 43 to pump chambers 157. Inlet valve means 173 are preferably formed from a single piece of spring steel (see FIG. 28) which is preferably five thousandths of an inch thick. The center portion 175 is attached to the top side of valve plate 25 by bolts means 77 extending through an aperture 177 through center portions 175. Aperture 177 is preferably square as best seen in FIG. 28 to receive a square portion 179 provided on the upper surface of valve plate 25 adjacent the center thereof to hold the inlet valve means 173 in place and prevent turning thereof. Each of inlet valve means 173 includes a resilient spring flap 181 extending radially outwardly from center portion 175 and formed integrally therewith. Also, each of the spring flaps 181 are biased towards closure of its associated inlet aperture 93. In other words the springs flaps 181 are arranged so that they extend radially outwardly adjacent the upper surface of valve plate 25 with the respective distal ends of flaps 181 being disposed adjacent and over an associated inlet aperture 93.

There is a recess 183 in the upper surface of valve plate 25 beneath each of the spring flaps 181 inwardly of inlet apertures 93 to prevent build up of chemicals beneath flaps 181 which might otherwise occur and prevent seating of flaps 181 over apertures 93.

Driving means 15 includes actuating means 185 for actuating pump means 13 and includes motor means 187 for driving actuating means 185 (see in general FIG. 1).

Motor means 187 is of any suitable construction such as an electric motor driven by a suitable power source, not shown, well known to those skilled in the art with the electricity being fed to the motor means 187 as through the electric cord 189. A suitable switch, not shown, well known to those skilled in the art is preferably provided for turning motor means 187 off and on. Motor means 187 includes a rotatable shaft 191.

Actuating means 185 includes a wobble or swash plate 193 mounted on shaft 191. The means for mounting swash plate 193 on shaft 191 preferably includes a hub 195 which has a cylindrical outer surface 197 which has its axis tilted relative to the axis of the central bore 199 of the hub 195. Hub 195 is fixedly mounted on shaft 191 by suitable means well known to those skilled in the art and has an inner race 201 of ball bearing means 203 fixedly attached thereto. The outer race 205 of ball bearing means 203 is fixedly attached to the swash plate 193 by suitable means as by press fitting the race 205 in the central recessed portion 207 of swash plate 193.

Swash plate 193 has a plurality of raised or dimpled portions 209 to establish a plurality of downwardly opening sockets 211 spaced around swash plate 193 and corresponding with the location of piston means 129 so that swash plate 193 is adapted to fit down on top of piston means 129 with the head of the screws 143 respectively fitting into the sockets 211.

Coupling means 213 is provided for detachably coupling motor means 187 to pump means 13 with the distal end means, i.e., the screws 143 of piston means 129 engaged in sockets 211 with swash plate 193 being disposed at an angle (see FIG. 3) for successively moving piston means 129 into said lowered positions and for subsequently allowing piston means 129 to successively move into said raised positions.

Coupling means 213 includes a cross member 215 which is attached to the lower side of motor means 187 by suitable means, as by bolts 217. Cross member 215 is provided with an aperture 219 centrally thereof through which shaft 191 rotatably extends. In addition cross member 215 includes slots 221 adjacent the opposite ends thereof. A ring 223 is mounted on top of flange 113 and is fixedly secured thereto by suitable means as screwbolt means 225 extending through the apertures 226 in flange 113 and 227 in ring 223. Raised portions 228 are provided in ring 223 on opposite sides of the ring. In each of raised portions 228 there is a threaded aperture 229 adapted to receive a threaded stud 231. Threaded stud 231 extends upwardly through one of slots 221 and into the lower end of a handle 233 where it is fixedly attached by suitable means well known to those skilled in the art. A nut 235 is threadedly engaged on threaded stud 231 beneath slot 221 to retain handle 233 on cross member 215 when the motor means 187 is detached from pump means 13, yet when it is desired to turn threaded stud 231 to attach and detach motor means 187 to and from pump means 13, handles 233 may be easily grasped and turned without the necessity for the user to have tools for this operation.

Outlet passage 85, which is in communication with outlet chamber 45 and extends upwardly therefrom terminates in an upwardly extending socket 237 formed in upper section 19. A discharge elbow fitting 239 includes a laterally extending portion 241 and a depending portion 243. Depending portion 243 is preferably in two parts, i.e., an upper part 245 and a coupling part 247. Upper part 245 is preferably formed of plastic integrally with laterally extending portion 241 and is provided with external threads at the lower end thereof which are threaded into a threaded socket 249 provided in the upper end of coupling part 247. The lower part 251 of coupling 247 is reduced in diameter and turnably received or rotatably fitted in upwardly extending socket 237. An O-ring seal 252 is provided on lower part 251. There is a shoulder 253 on the outside of coupling part 247 where the upper end of lower part 251 terminates and which shoulder limits downward movement of coupler 247. Laterally extending portion 241 is internally threaded at the distal end thereof to threadably receive a discharge hose 257. Discharge hose 257 is fitted with a suitable discharge nozzle, meters or the like, well-known to those skilled in the art.

Bracket means 259 is attached to motor means 187 as by means of a band 261 encircling motor means 187. Bracket means 259i is provided with an aperture 263 therethrough adjacent the distal end thereof. Bracket means 259 extends over elbow fitting 239 with the cylindrical head of a bolt or projection 265 extending upwardly through aperture 263. Bolt 265 is threadedly received in elbow fitting 239 or formed as an integral projection therefrom along the vertical center line thereof so that fitting 239 may be turned to position discharge hose 257 as desired and yet bracket means 259 prevents the elbow fitting 239 from moving upwardly or being removed from socket 237 while motor means 187 is running or in place. It will be understood that the above structure provides safety means for the apparatus of the present invention.

A by-pass valve 267 is provided in lower section 21 to by-pass fluid back to inlet chamber 43 from outlet chamber 45 when the pressure in outlet chamber 45 rises above a selected point. As for example, pressure will rise when motor means 187 is operating and the discharge hose 257 is closed off as by the nozzle on the end thereof being closed. By-pass valve 267 includes a by-pass chamber 269 formed in lower section 21. A ball valve 271 is seated in an aperture 273 provided in a wall 275 of by-pass chamber 269. a spring 277 urges ball valve 271 towards a normally seated position in aperture 273 to block flow therethrough from outlet chamber 45 to by-pass chamber 269. When the pressure in outlet chamber 45 exceeds a predetermined amount, ball valve 271 is moved downwardly to allow the passage of fluid through aperture 273 into by-pass chamber 269 and through another aperture 279 in inner wall 41 so that the fluid is by-passed back to inlet chamber 43.

A non-drip valve means 281 is provided in inlet pipe means 47 for reducing drip of chemicals and the like from inlet pipe means 47 when the pumping is stopped and inlet pipe means is withdrawn from connecting means 53. Valve means 281 preferably comprises a circular flexible rubber-like valve means 283 which is preferably supported centrally thereof by a plastic rod 285 which in turn is attached to valve plate 25 as by bolt means 77 being threaded into the upper end thereof. The lower end of plastic rod 285 has a button 287 and a groove 289 between button 287 and the main body of plastic rod 285. The central aperture 283' in valve member 283 is smaller than button 287 so that valve member 283 is assembled therewith by forcing same over the button 287 and is retained in groove 289. The lower end of inlet pipe means 47 extends inwardly for a distance to provide an annular valve seat 291 for the peripheral portion of valve member 283. Thus, it will be understood that non-drip valve means 281 will allow liquid to flow upwardly from intake pipe P into inlet pipe means 47 while apparatus 11 is pumping (see the broken line showing in FIG. 3 of valve member 283 in the open position) but will prevent liquid from flowing downwardly out of inlet pipe means 47 when pumping is stopped and inlet pipe means 47 is removed from connecting means 53.

When the user receives the container C, it will have a suitable plug or cap, not shown, in the opening O which is removed and then the connecting means 53 with the intake pipe P connected thereto is inserted through opening O and screwed into place. Next, to prepare for the operation of pumping apparatus 11, the user connects pump means 13 with connecting means 53 by inserting inlet pipe means 47 into the upper end of upper pipe like portion 55 and engages catch means 65 in groove 51 to lock pump means 13 to connecting means 53. Then, with the discharge hose 257 attached to elbow fitting 239, he places elbow fitting 239 into socket 237. Next, he moves driving means 15 into place by fitting swash plate 193 down onto piston means 129 with the heads of screws 143 being received in sockets 211. Since swash plate 193 is at an angle relative to shaft 191 and piston means 129, some of the piston means 129 will be depressed towards said lowered position and other of the piston means 129 will be partially raised or in an upper position. Driving means 15 is then quickly and easily attached to pump means 13 by the coupling means 213. Thus, the user simply aligns the threaded studs 231 with the apertures 229 and turns handles 223 to thread studs 231 into apertures 229. The above mentioned alignment is easily accomplished since there is a cut out portion 293 in swash plate 193 into which fits depending portion 243 when the swash plate is in correct alignment and aperture 263 fits over the head of bolt 265. Thus, there is only one way for the swash plate 193 to fit. The motor means 187 is turned on which causes swash plate 193 to wobble and cause upward and downward movement of the piston means 129. It will be understood that the upward and downward movement of piston means 129 is limited by the stroke of swash plate 193. This in turn causes the liquid chemical to be drawn up through the intake pipe P into the inlet pipe means 47 and the inlet chamber 43 due to the pumping action of the piston means 129. It will be understood that when a piston means 129 moves upwardly, it will cause a suction action to pull the liquid chemical through intake pipe P, inlet pipe means 47, inlet chamber 43, through inlet apertures 93, whereupon it lifts spring flaps 181 so that the liquid passes into pump chamber 157. This action is shown in FIG. 3 wherein it will be seen that the piston means 129 to the right has substantially moved into said raised position drawing liquid into chamber 157 through inlet aperture 93 which is shown open or unblocked by the raised flap 181. Then downward movement of the piston means 129 causes pressure in chamber 157 to close the spring flap 181 and open leaf spring 161, 163 to move the liquid chemical through the outlet aperture 95 into the outlet chamber 45, outlet passage 85, elbow fitting 239 and then through discharge hose 257. This action is shown in FIG. 3 wherein it will be seen that the piston means 129 to the left is forcing liquid against outlet valve means 159 to open same and allow the liquid to flow from pump chamber 157 through the open or unblocked outlet aperture 95. From discharge hose 257 the liquid is forced through the counter or other auxiliary equipment, not shown, and through the dispensing nozzle, not shown, and into the desired place of use, as a tank, spray equipment or the like. It will be understood that if the user has different types of chemicals to be dispensed from different containers C, he may leave the pump means 13 on a particular container C and move the driving means 15 to the next container C having chemicals to be dispensed without intermingling the residual chemicals in the pump means so that the chemicals will not become mixed and yet the user only needs to buy one driving means 15 which is by far the most expensive part of the apparatus 11.

From the foregoing it will be understood that apparatus 11 provides a very safe system preventing contact of the chemicals by human hands during the entire operation of attaching and detaching driving means 15, dispensing of the liquid chemicals and disposing of the container C, etc. Also, it will be understood that pumping apparatus 11 is so efficient that low power such as 12 volts can be used.

Although the present invention has been described and illustrated with respect to a preferred embodiment thereof and a preferred use thereof, it is not to be so limited since changes and modifications can be made therein which are within the full intended scope of the invention.

I claim:

1. A pumping apparatus for heavy viscous chemicals and the like comprising:
    (a) a pump body, said pump body being provided with an inlet chamber and an outlet chamber separated from said inlet chamber;
    (b) diaphragm means having first and second sides for coacting with said pump body to restrict the flow of chemicals to said second side;
    (c) a valve plate in said pump body on said second side of said diaphragm means provided with a plurality of inlet apertures and outlet apertures therethrough;
    (d) means in said pump body on said second side of said diaphragm means for establishing partly with said valve plate a plurality of pump chambers respectively communicating with said inlet apertures and said outlet apertures;
    (e) a plurality of spring actuated inlet valve means on said second side of said diaphragm means operating respectively in conjunction with said inlet apertures for the opening and closing thereof to govern flow from said inlet chamber to said pump chambers;

(f) a plurality of spring actuated outlet valve means on said second side of said diaphragm means operating respectively in conjunction with said outlet apertures for the opening and closing thereof to govern flow from said pump chambers to said outlet chamber;

(g) a plurality of piston means attached to said diaphragm means and operable respectively relative to said pump chambers movable between a raised position and a lowered position in said pump chambers, each of said piston means including spring means associated therewith for moving said piston means to said raised position;

(h) motor means including a rotatable shaft;

(i) non-rotatable swash plate means attached to said shaft and freely engaging said piston means for successively moving said piston means into said lowered positions and for subsequently allowing said piston means to successively move into said raised positions; and, (j) means detachably coupling said motor means and said swash plate means to said pump body on said first side of said diaphragm means for allowing said swash plate means with said motor means to be quickly attached to or removed from said pump body without requiring any mechanical connection or disconnection between said swash plate means and said piston means.

2. The pumping apparatus of claim 1 in which each of said outlet valve means includes a pair of adjacent leaf springs disposed in flat face to face engagement, and attaching means for attaching said leaf springs to said valve plate.

3. A pumping apparatus for heavy viscous chemicals and the like comprising:

(a) a pump body, said pump body being provided with an inlet chamber and an outlet chamber separated from said inlet chamber;

(b) diaphragm means in said pump body;

(c) a valve plate in said pump body provided with a plurality of inlet apertures and outlet apertures therethrough;

(d) means in said pump body establishing partly with said valve plate a plurality of pump chambers respectively communicating with said inlet apertures and said outlet apertures;

(e) a plurality of spring actuated inlet valve means operating respectively in conjunction with said inlet apertures for the opening and closing thereof to govern flow from said inlet chamber to said pump chambers;

(f) a plurality of spring actuated outlet valve means operating respectively in conjunction with said outlet apertures for the opening and closing thereof to govern flow from said pump chambers to said outlet chamber, said outlet valve means being arranged in pairs, each of said pairs including an arcuate flat and resilient upper leaf spring and an arcuate flat and resilient lower leaf spring disposed in face to face engagement with said upper leaf spring, said upper leaf spring being of a lesser thickness than said lower leaf spring;

(g) a plurality of piston means attached to said diaphragm means and operable respectively relative to said pump chambers movable between a raised position and a lowered position in said pump chambers, each of said piston means including spring means associated therewith for moving said piston means to said raised position;

(h) motor means including a rotatable shaft;

(i) non-rotatable swash plate means attached to said shaft and engaging said piston means for successively moving said piston means into said lowered positions and for subsequently allowing said piston means to successively move into said raised positions; and (j) pin means integrally attached to said valve plate and extending downwardly therefrom respectively between each of said pairs of outlet valve means, said upper and lower leaf springs of each of said pairs of upper and lower leaf springs being provided with hole means intermediate the ends of said leaf springs for receiving said pin means to hold said upper and lower leaf springs in place with said upper and lower leaf springs extending oppositely from said pin means and being respectively disposed under said outlet apertures with which said outlet valve means are operating in conjunction.

4. The pumping apparatus of claim 3 in which each of said outlet valve means includes a resilient spring flap biased towards closure of one of said apertures.

5. The pumping apparatus of claim 4 in which means is provided for attaching said flap to said valve plate adjacent the center of said valve plate with said flap extending radially outwardly adjacent the upper surface of said valve plate and with the distal end of said flap being disposed adjacent and over said one of said inlet apertures, and said valve plate being provided with a recess means inwardly of said one of said inlet apertures for preventing build-up of chemicals beneath said flap.

6. A pumping apparatus for heavy viscous chemicals and the like comprising:

(a) a pump body, said pump body being provided with an inlet chamber and an outlet chamber separated from said inlet chamber;

(b) diaphragm means in said pump body;

(c) a valve plate in said pump body provided with a plurality of inlet apertures and outlet apertures therethrough;

(d) means in said pump body establishing partly with said valve plate a plurality of pump chambers respectively communicating with said inlet apertures and said outlet apertures;

(e) a plurality of spring actuated inlet valve means operating respectively in conjunction with said inlet apertures for the opening and closing thereof to govern flow from said inlet chamber to said pump chambers;

(f) a plurality of spring actuated outlet valve means operating respectively in conjunction with said outlet apertures for the opening and closing thereof to govern flow from said pump chambers to said outlet chamber;

(g) a plurality of piston means attached to said diaphragm means and operable respectively relative to said pump chambers movable between a raised position and a lowered position in said pump chambers, each of said piston means including spring means associated therewith for moving said piston means to said raised position;

(h) motor means including a rotatable shaft;

(i) non-rotatable swash plate means attached to said shaft and engaging said piston means for successively moving said piston means into said lowered positions and for subsequently allowing said piston means to successively move into said raised positions;
(j) an inlet pipe means communicated with said inlet chamber and depending from said pump body,
(k) connecting means for detachably connecting said pipe means in the bunghole of a container of heavy viscous chemicals and the like, and
(l) non-drip valve means in said inlet pipe means for reducing drip of chemicals and the like from said inlet pipe means when withdrawn from said connecting means.

7. A pumping apparatus for heavy viscous chemicals and the like, the combination comprising:
  (a) pump means including:
    (i) diaphragm means having first and second sides for restricting the flow of chemicals to said second side;
    (ii) means on said second side of said diaphragm means establishing a plurality of pump chambers;
    (iii) a plurality of piston means attached to said diaphragm means and respectively operating in conjunction with said pump chambers, each of said piston means including an upwardly extending rod means terminating in distal end means at the upper end thereof, said piston means being respectively movable between raised positions and lowered positions in said pump chambers, each of said piston means including spring means associated therewith for moving each of said piston means to a said raised position;
  (b) detachable driving means including:
    (i) motor means including a rotatable shaft;
    (ii) non-rotatable swash plate means attached to said shaft; and
  (c) means for detachably coupling said driving means to said pump means on said first side of said diaphragm means with said distal end means freely engaging said swash plate means and with said swash plate means being disposed at an angle for successively moving said piston means into said lowered positions and for subsequently allowing said piston means to successively move into said raised positions and for allowing said driving means including said swash plate means to be easily and quickly attached to and removed from said pump means without requiring any mechanical connection or disconnection between said swash plate means and said distal end means.

8. The combination of claim 7 in which said swash plate means includes a plurality of socket means therein, and in which said distal means respectively engage said socket means.

9. The combination of claim 7 in which each of said piston means includes an upper head means disposed above said diaphragm means to which is integrally attached said rod means, a lower head means disposed below said diaphragm means, means urging said upper and lower head means together to clamp a portion of said diaphragm means therebetween.

10. A pumping apparatus for heavy viscous chemicals and the like, the combination comprising:
  (a) motor means including a rotatable shaft;
  (b) pump means including:
    (i) diaphragm means;
    (ii) means establishing a plurality of pump chambers;
    (iii) a plurality of piston means attached to said diaphragm means and respectively operating in conjunction with said pump chambers, each of said piston means including an upwardly extending rod means terminating in distal end means at the upper end thereof, said piston means being respectively movable between raised positions and lowered positions in said pump chambers, each of said piston means including spring means associated therewith for moving each of said piston means to a said raised position;
    (iv) an outlet passage terminating in an upwardly extending socket,
    (v) a discharge elbow fitting including a laterally extending portion adapted to receive a discharge hose and a depending portion rotatably fitted in said upwardly extending socket, and
    (vi) bracket means attached to said motor means and extending over said elbow fitting to prevent removal of said elbow fitting without first removing said motor means;
  (c) non-rotatable swash plate means attached to said shaft; and
  (d) means for detachably coupling said motor means to said pump means with said distal end means engaging said swash plate and with said swash plate being disposed at an angle for successively moving said piston means into said lowered positions and for subsequently allowing said piston means to successively move into said raised positions.

11. A pumping apparatus for heavy viscous chemicals and the like, the combination comprising:
  (a) pump means including:
    (i) a pump body having an inlet chamber;
    (ii) diaphragm means;
    (iii) means establishing a plurality of pump chambers;
    (iv) a plurality of piston means attached to said diaphragm means and respectively operating in conjunction with said pump chambers, each of said piston means including an upwardly extending rod means terminating in distal end means at the upper end thereof, said piston means being respectively movable between raised positions and lowered positions in said pump chambers, each of said piston means including spring means associated therewith for moving each of said piston means to a said raised position;
    (v) an inlet pipe means communicated with said inlet chamber and depending from said pump body,
    (vi) connecting means for detachably connecting said pipe means from the bunghole of a container of heavy viscous chemicals and the like, and
    (vii) non-drip valve means in said inlet pipe means for reducing drip of chemicals and the like from said inlet pipe means when withdrawn from said connecting means;
  (b) motor means including a rotatable shaft;
  (c) non-rotatable swash plate means attached to said shaft; and
  (d) means for detachably coupling said motor means to said pump means with said distal end means engaging said swash plate and with said swash plate being disposed at an angle for successively moving said piston means into said lowered positions and for subsequently allowing said piston means to successively move into said raised positions.

* * * * *